(12) United States Patent
Yamada

(10) Patent No.: US 8,040,550 B2
(45) Date of Patent: Oct. 18, 2011

(54) IMAGE FORMING APPARATUS WITH A RATIO CHANGE OF RECEIVE BUFFER IN RESPONSE TO A CANCELLATION INSTRUCTION

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 944 days.

(21) Appl. No.: 11/420,844

(22) Filed: May 30, 2006

(65) Prior Publication Data
US 2006/0268312 A1    Nov. 30, 2006

(30) Foreign Application Priority Data

May 30, 2005 (JP) ................................. 2005-156835

(51) Int. Cl.
*G06K 15/00* (2006.01)
(52) U.S. Cl. ....................... 358/1.17; 358/1.14; 358/1.16
(58) Field of Classification Search ................. 358/1.17, 358/1.16
See application file for complete search history.

(56) References Cited

U.S. PATENT DOCUMENTS

| | | | | |
|---|---|---|---|---|
| 6,046,817 | A * | 4/2000 | Brown et al. ................. | 358/1.16 |
| 6,333,789 | B1 * | 12/2001 | Shima ........................... | 358/1.15 |
| 2002/0067492 | A1 * | 6/2002 | Ueda ............................. | 358/1.9 |
| 2004/0001499 | A1 * | 1/2004 | Patella et al. ................. | 370/412 |
| 2004/0114184 | A1 * | 6/2004 | Sugiyama ..................... | 358/1.18 |
| 2005/0018240 | A1 * | 1/2005 | Shima et al. ................. | 358/1.15 |

FOREIGN PATENT DOCUMENTS

| | | |
|---|---|---|
| JP | H05-238076 A | 9/1993 |
| JP | 1996011396 A | 1/1996 |
| JP | H09-274546 A | 10/1997 |
| JP | 1998058788 A | 3/1998 |
| JP | H10-058788 A | 3/1998 |
| JP | H10-254659 A | 9/1998 |
| JP | 2000020255 A | 1/2000 |
| JP | 2000-326595 A | 11/2000 |
| JP | 2001-310507 A | 11/2001 |
| JP | 2003266881 A | 9/2003 |
| JP | 2004-334489 A | 11/2004 |

OTHER PUBLICATIONS

Japan Patent Office; Notification of Reason for Refusal in Japanese Patent Application No. 2005-156835 (counterpart to the above captioned US application) mailed May 18, 2010.
Japan Patent Office, Notification of Reason for Refusal in Japanese Patent Application No. JP 2005-156835, dated Aug. 17, 2010 (counterpart to above-captioned U.S. patent application).

* cited by examiner

*Primary Examiner* — Benny Tieu
*Assistant Examiner* — Qian Yang
(74) *Attorney, Agent, or Firm* — Baker Botts L.L.P.

(57) ABSTRACT

An image forming apparatus that includes: a receiving unit that receives print data via a communication line; a storage unit that includes a plurality of storage areas, which includes at least a receive buffer area that temporarily stores the print data received by the receiving unit; an image forming unit that carries out an image forming process based on the print data; a cancellation instruction unit that issues an instruction to cancel the image forming process by the image forming unit with respect to the print data being received by the receiving unit; and a ratio change unit that increases a ratio of the receive buffer area in the storage unit based on the cancellation having been instructed by the cancellation instruction unit.

20 Claims, 4 Drawing Sheets

IMAGE FORMING APPARATUS WITH A RATIO CHANGE OF RECEIVE BUFFER IN RESPONSE TO A CANCELLATION INSTRUCTION

CROSS REFERENCE TO RELATED APPLICATION

This application claims priority from Japanese Patent Application No. 2005-156835, filed on May 30, 2005, the entire subject matter of which is incorporated herein by reference.

TECHNICAL FIELD

Aspects of the present invention relate to an image forming apparatus that receives print data and carries out an image forming process based on the print data.

BACKGROUND

JP-A-2000-20255 discloses a laser printer, which temporarily stores print data in a receive buffer while receiving the print data from a host computer, reads and analyzes the print data stored in the receive buffer, and executes a printing process while expanding the print data to a work memory. When there is a space area in the receive buffer, the laser printer sequentially receives the print data from the host computer. In the event that there is no space area, the laser printer sends, for example, a busy signal to the host computer and makes the host computer to wait transmitting the print data.

The laser printer disclosed in JP-A-2000-20255 includes a function of canceling the printing process for the print data being received. A space area of the receive buffer is maintained by canceling print data which no longer requires the printing process, thereby making it possible to receive the print data from the host computer in the space area.

SUMMARY

Normally, the transmission speed at which the print data is transmitted from the host computer is higher than the processing speed at which a cancellation operation is carried out to cancel the print data stored in the receive buffer. For this reason, even though the cancellation operation is carried out, the sequential print data is transmitted from the host computer and, in some cases, fills the space area of the receive buffer. Then, the cancellation process for the print data stored in the receive buffer is carried out, and the host computer waits to transmit the print data until a space area is secured in the receive buffer. This increases the waiting time.

Such a problem occurs not only in the case in which the cancellation operation is carried out, but also, for example, in a case in which data-format print data which requires time for the printing process is transmitted from the host computer. Normally, the transmission speed at which the print data is transmitted from the host computer is higher than the processing speed of the printing process for the print data stored in the receive buffer. For this reason, for example, in the course of receiving data-format (data-type) print data which requires time for the printing process and carrying out the printing process, the print data gradually fills the space area of the receive buffer. Then, the printing process for the print data stored in the receive buffer is carried out, and the host computer waits to transmit the print data until a space area is secured in the receive buffer. This increases the waiting time.

As a method for dealing with such problems, for example, it can be considered to secure a large storage capacity of the receive buffer in advance. However, the data amount of the print data transmitted from the host computer varies, and it cannot be previously determined how much storage capacity of the receive buffer should be secured. Nevertheless, in the event that the storage area of the receive buffer is needlessly increased in a memory included in the laser printer, other memory areas including the work memory are reduced. If a memory of larger storage capacity is utilized, the cost increases.

Aspects of the invention provide an image forming apparatus that can rapidly release a transmission standby state for print data.

According to an aspect of the invention, there is provided an image forming apparatus including: a receiving unit that receives print data via a communication line; a storage unit that includes a plurality of storage areas, which includes at least a receive buffer area that temporarily stores the print data received by the receiving unit; an image forming unit that carries out an image forming process based on the print data; a cancellation instruction unit that issues an instruction to cancel the image forming process by the image forming unit with respect to the print data being received by the receiving unit; and a ratio change unit that increases a ratio of the receive buffer area in the storage unit based on the cancellation having been instructed by the cancellation instruction unit.

The "image forming apparatus" may be not only a printing apparatus such as a printer, but also a facsimile apparatus or a multi-function machine including a printer function, a scanner function and the like.

According to the aspect of the invention, when the image forming process for the print data being currently received is cancelled by the cancellation instruction unit, the ratio of the receive buffer area in the storage unit is expanded by the ratio change unit. Consequently, it is possible to store a larger amount of print data in the expanded storage area, thereby making it possible to rapidly release the transmission standby state at a print data transmission source. Also, the receive buffer area is not always maintained large, but the configuration is such that the receive buffer area is expanded in the event that a cancellation instruction is issued. Therefore, it is not necessary to maintain a wide receive buffer area in advance.

According to another aspect of the invention, there is provided an image forming apparatus including: a receiving unit that receives print data via a communication line; a storage unit that includes a plurality of storage areas, which includes at least a receive buffer area that temporarily stores the print data received by the receiving unit; an image forming unit that carries out an image forming process based on the print data; a data type detection unit which detects a data type of the print data being received by the receiving unit; and a ratio change unit that increases a ratio of the receive buffer area in the storage unit in the event that the data type detected by the data type detection unit fulfills a prescribed condition.

In a case in which the print data from the transmission source is, for example, PDL (Page Description Language) data, as it is necessary to create page data from the PDL data, the image forming process requires more time than in a case in which the print data from the transmission source is, for example, image data (for example, dumb data=data which is binary processed at the transmission source or compressed and transmitted to the image forming apparatus). Therefore, in the above aspect, the configuration is such that, for example, in the event that the print data of such a data type which requires time for the image forming process is being received, the ratio of the receive buffer area in the storage unit is expanded by the ratio change unit. Consequently, it is possible to store a larger amount of print data in the expanded storage area, thereby making it possible to rapidly release the transmission standby state at the print data transmission source. Also, the receive buffer area is not always maintained large, but the configuration is such that the receive buffer area is expanded in the event that a cancellation instruction is issued. Therefore, it is not necessary to maintain a wide receive buffer area in advance.

DETAILED DESCRIPTION

One aspect of the invention will be described with reference to FIGS. 1 to 4.

1. Configuration of this Aspect

Figure 1:
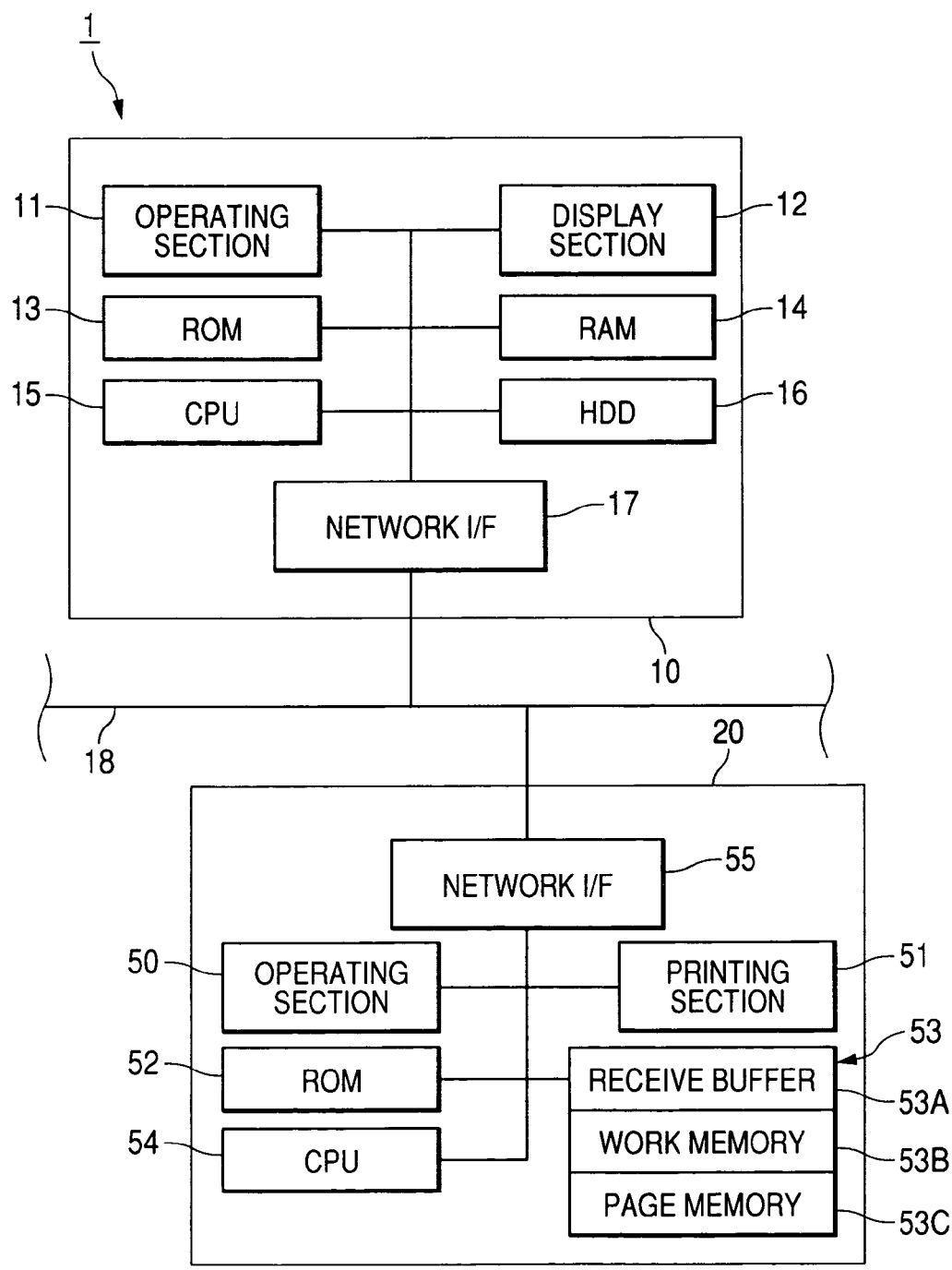
FIG. 1 is a block diagram showing a configuration of a printing system according to an aspect of the invention.

FIG. 1 is a block diagram showing a configuration of a printing system 1 according to this aspect. In the printing system 1, a personal computer 10, which acts as a terminal apparatus, and a laser printer (hereafter referred to as a "printer 20" are connected to the Internet 18 via, for example, network interfaces 17 and 55. The personal computer 10 and the printer 20 are configured in such a way as to be capable of performing data communication between them. The printer 20 receives print data transmitted from the personal computer 10 and carries out a printing process based on the print data.

(1) Personal Computer

The personal computer 10 includes an operating section 11 that receives an input operation from the exterior (for example, input parts such as a keyboard and a mouse), a display section 12 that displays various images, a ROM 13, a RAM 14, a CPU 15, a hard disk 16, and the network interface 17. Application software, a printer driver and the like, which are used to create information to be printed, are stored in the hard disk 16. The CPU 15, based on an activation instruction from the operating section 11, reads the application software, printer driver and the like from the hard disk 16 and activates them.

When a printing request instruction is received from the operating section 11 according to a user's input operation, the print data created in the application software is delivered to the printer driver, wherein an expansion (conversion) process which converts the print data into, for example, PDL data is carried out, followed by data transmission via the network interface 17. The print data transmitted from the personal computer 10 includes different types of data, including not only PDL data (PS (PostScript) data, PCL (Printer Control Language) data), which requires a page data creation process (a process of expansion into bitmap data) on the printer 20 side, but also bitmap data (expanded binary data, GDI (Graphic Device Interface) data), which does not require the page data creation process on the printer 20 side.

(2) Printer (a) Structure

Figure 2:
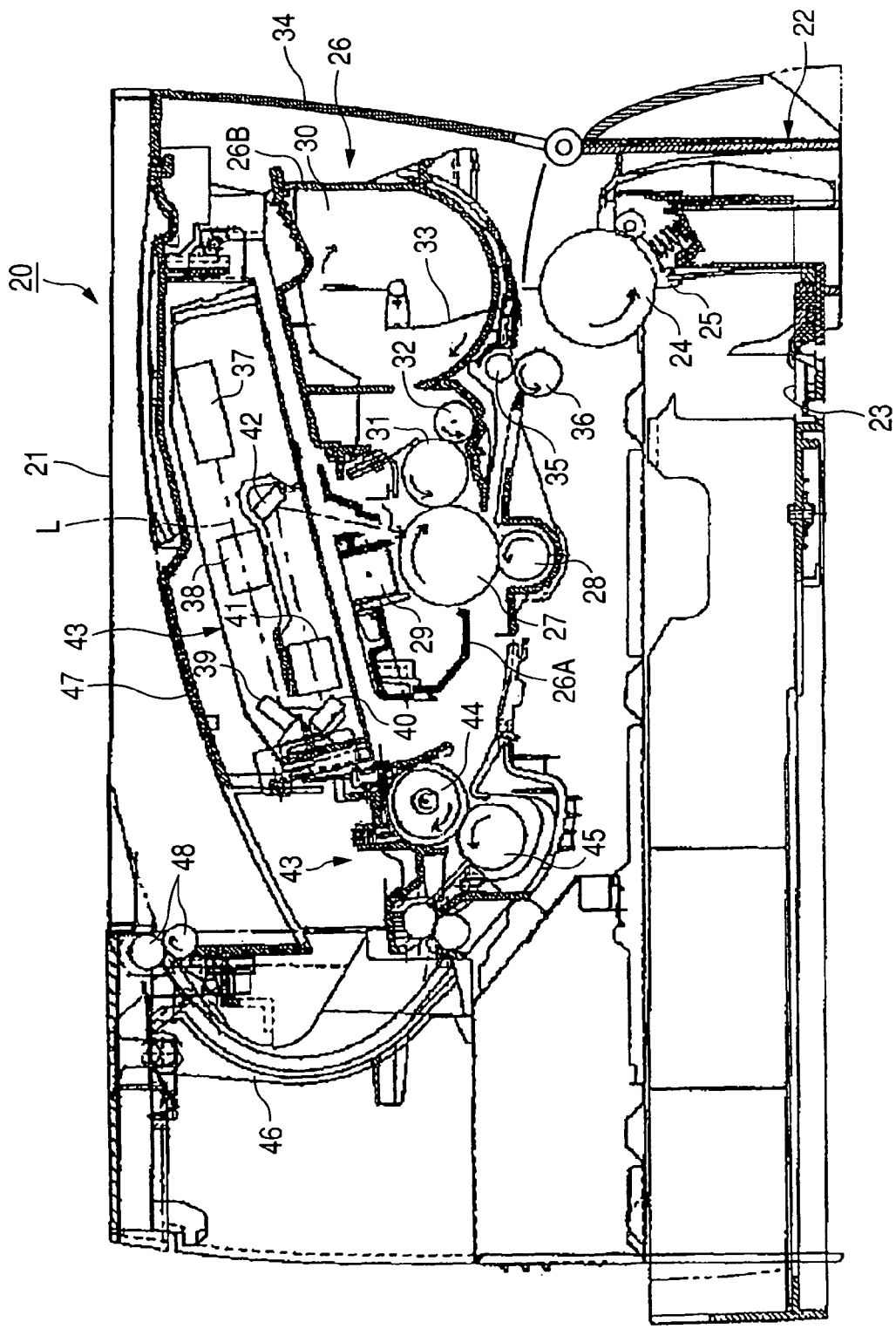
FIG. 2 is a sectional side view showing an internal structure of a printer.

FIG. 2 is a sectional side view showing an internal structure of the printer 20. As shown in FIG. 2, the printer 20 includes a housing 21. A sheet feed cassette 22, which contains sheets as stacked recording media, is attached to the lower portion of the housing 21. The sheet feed cassette 22 is made attachable and detachable, wherein it can be removed by pulling it out toward the front of the printer 20 (in the right direction in FIG. 2). A sheet urging plate 23, which is urged upward by a pressure spring (not shown), is provided on the sheet feed cassette 22, being configured in such a way that the uppermost sheet of the sheets stacked on the sheet urging plate 23 comes into contact with a feed roller 24. The feed roller 24 is provided in the front of the printer 20 and rotates in the arrowed direction. The sheet is separated and fed one by one by the action of a separation pad 25.

A process cartridge 26 is disposed above the sheet feed cassette 22. Similar to the sheet feed cassette 22, the process cartridge 26 is also made attachable and detachable from the front of the printer 20. The process cartridge 26 is configured by having a photosensitive member cartridge 26A and a developer cartridge 26B assembled thereto in such a way as to be separable from one another. The photosensitive member cartridge 26A is provided with a photosensitive drum 27, which carries a toner image, a transfer roller 28, which transfers a toner image carried by the photosensitive drum 27 to the sheet, and a scorotron type charger 29, by which a corona discharge is generated to charge the surface of the photosensitive drum 27 to a positive potential. The developer cartridge 26B is provided with a developer chamber 30, which contains a toner, a development roller 31, which supplies the toner to the photosensitive drum 27, and a supply roller 32, which supplies the toner to the development roller 31. An agitator 33 for agitating the toner is provided in the developer chamber 30.

In the front of the printer 20, from which the sheet feed cassette 22 is attached and detached, a front cover 34, which is rotatably attached at the lower end thereof and is made openable and closeable, is provided above the sheet feed cassette 22. By opening the front cover 34, it is possible to attach and detach the process cartridge 26. A pinch roller 35 and a registration roller 36 are rotatably disposed between the process cartridge 26 and the sheet feed cassette 22.

A laser scanner unit 43, which includes a laser emitter (not shown) which emits a laser beam, a polygon mirror 37 (hexahedral mirror) which is rotary driven, a lens 38, a reflecting mirror 39, a reflecting mirror 40, a lens 41, a reflecting mirror 42 and the like, is disposed above the process cartridge 26. A laser beam L reflected off the polygon mirror 37 is caused to irradiate the photosensitive drum 27 via the lens 38, reflecting mirrors 39 and 40, lens 41 and reflecting mirror 42, whereby an electrostatic latent image is formed on the surface of the photosensitive drum 27.

A fixing unit 43 for fixing a toner on the sheet is provided on the rear side of the process cartridge 26. The fixing unit 43 includes a heating roller 44 for heating and fusing the transferred toner on the sheet and a pressure roller 45 which, being disposed opposite the heating roller 44, presses the sheet being fed toward the heating roller 44.

A U-shaped shooter 46, which transports the sheet from the fixing unit 43 in such a way as to turn it upside down by inverting the transportation direction of the sheet, is provided behind the fixing unit 43. A pair of sheet discharge rollers 48 and 48, which discharge the sheet onto a sheet discharge tray 47 formed on the top surface of the housing 21, is attached to the leading edge of the shooter 46.

(b) Software Configuration

A software configuration of the printer 20 is shown in a simplified form in FIG. 1. The printer 20 includes an operating section 50 that receives various kinds of input operation, a printing section 51 that controls printing on the sheet, a ROM 52, a RAM 53 (storage unit), a CPU 54 and a network interface 55 (receiving unit). The storage area of each of a receive buffer 53A (receive buffer area), a work memory 53B and a page memory 53C is secured in the RAM 53. The allocation of storage capacity of each storage area is set to a prescribed default ratio, for example, when the printer 20 is powered on.

2. Operation of this Aspect

The CPU 54 of the printer 20, while receiving the print data transmitted from the personal computer 10, temporarily stores it in the receive buffer 53A. Then, the CPU 54 reads and analyzes the print data stored in the receive buffer 53A. In the event that the print data is the PDL data, the CPU 54 expands it to the work memory 53B to create page data and, while storing the page data in the page memory 53C, sends it sequentially to the printing section 51. The printing section 51, based on the page data sent, executes a printing operation in which an image corresponding to the print data is printed on the sheet. In the event that the print data stored in the receive buffer 53A is the bitmap data, as it does not require a process of expansion into the page data, the CPU 54 stores the print data in the page memory 53C as it is.

Also, the CPU 54 of the printer is configured in such a way that, if there is a space area in the receive buffer 53A, it sequentially receives the print data from the personal computer 10. If there is no space area, the CPU 54 sends, for example, a busy signal to the personal computer 10 and makes the personal computer 10 to wait transmitting the print data.

(1) Cancellation Process

The printer 20 has a function (cancellation function) of canceling a printing process for the print data being received. A cancellation process by the CPU 54 will hereafter be described with reference to the flowchart shown in FIG. 3.

Figure 3:
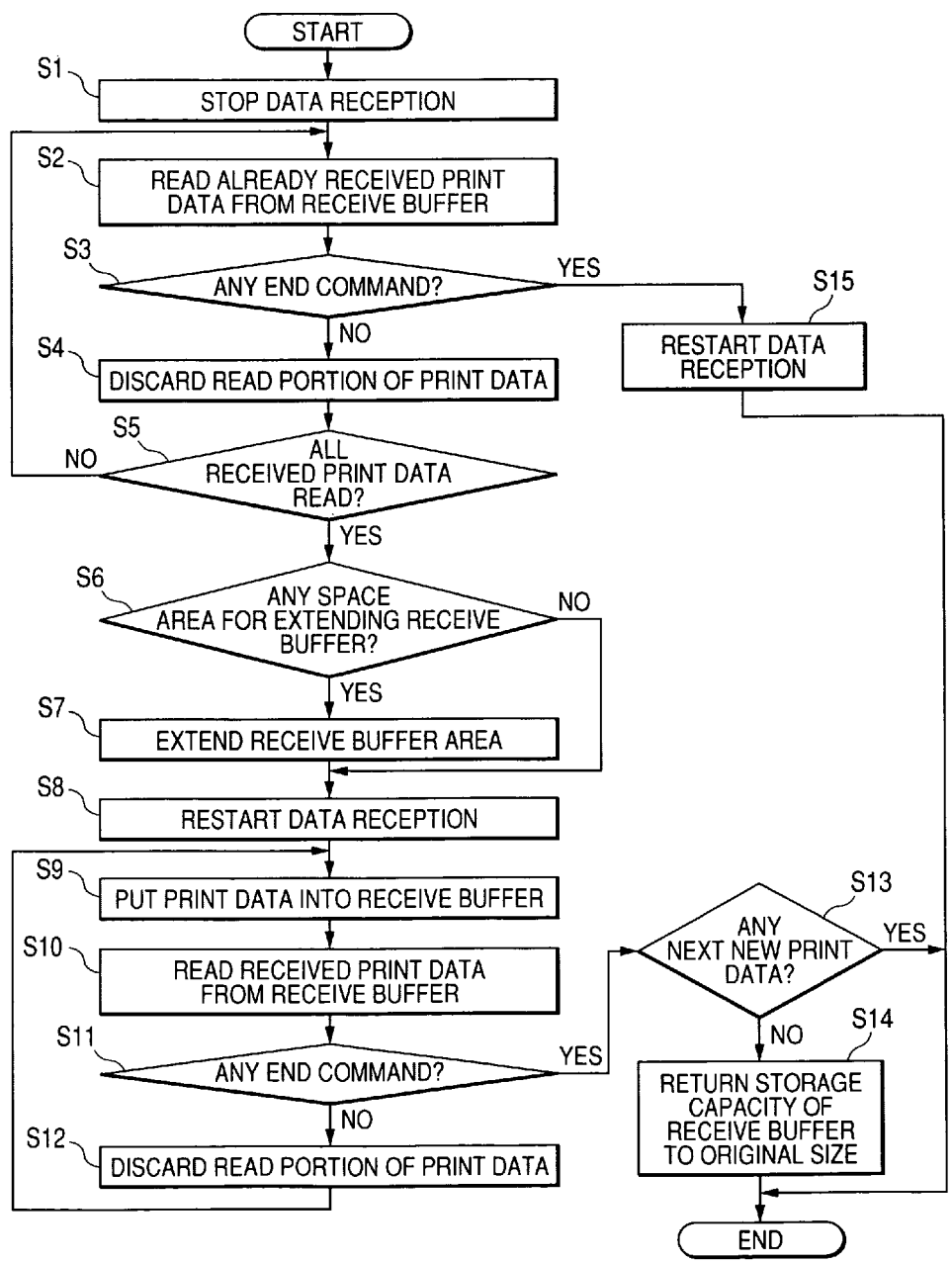
FIG. 3 is a flowchart showing a cancellation process.
Figure 4:
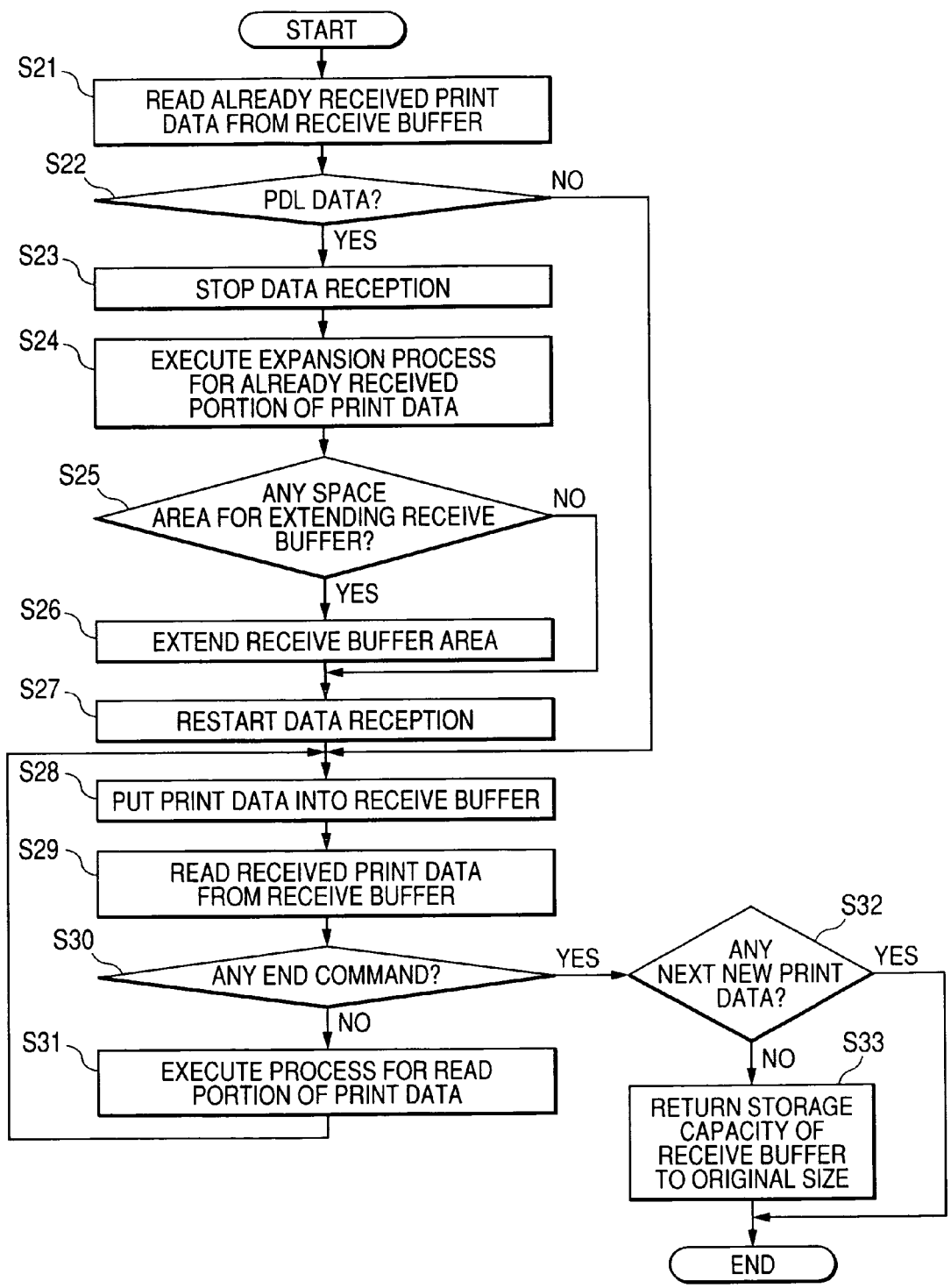
FIG. 4 is a flowchart showing a data-type-dependent process.

During reception of the print data, when the user carries out an input operation to instruct a cancellation by means of the operating section 50, the CPU 54 executes the cancellation process shown in FIG. 3. Specifically, the CPU 54 stops the reception in S1, for example, by sending the busy signal to the personal computer 10.

Subsequently, in S2, among the print data being received (which may be referred to as the "print data to be cancelled" in the description of the cancellation process), the CPU 54 reads a portion of print data, which has already been stored in the receive buffer 53A, in order for each prescribed unit amount of data. Then, the CPU 54 determines in S3 whether or not there is an end command, which indicates the end of the print data to be cancelled, in the read portion of print data. If there is the end command (Y in S3), as it means that the CPU 54 has received all the print data to be cancelled, it brings the cancellation process to an end without directly discarding the print data. Then, the CPU 54 releases the data reception from the stop (S15) and comes into a transmission standby state in which it waits for new print data to be transmitted from the personal computer 10.

On the contrary, if there is no end command (N in S3), in S4, the CPU 54 discards (reads and simply discards) the read portion of print data without conducting the process of expansion to the work memory 53B or the like. Specifically, the receive buffer 53A, which is made up of a ring buffer, moves a data write pointer to a storage start position for the data to be discarded, thus making it possible to write other data thereover.

After the CPU 54 has repeatedly carried out the above process S1 to S4, in the event that there is eventually no end command in the portion of print data stored in the receive buffer 53A and it has read all the print data received (N in S3 and Y in S5), it determines in S6 whether or not the RAM 53 has a space area for extending the receive buffer 53A. At this time, the CPU 54 functions as a "space area check unit". In the event that the cancellation function has been executed, as the process of expansion to the work memory 53B or the like is not carried out, it is often the case that no problem is posed even if, for example, partial storage capacity of the work memory 53B and the page memory 53C is temporarily allocated to the receive buffer 53A.

Consequently, if there is the space area (Y in S6), in S7, the CPU 54 allocates the partial storage capacity of the work memory 53B and the page memory 53C to the receive buffer 53A, thus extending the storage capacity of the receive buffer 53A. That is, the ratio of the receive buffer 53A in the RAM 53 is increased. At this time, the CPU 54 functions as a "ratio change unit". Then, in S8, the CPU 54 restarts receiving the print data from the personal computer 10. At this time, as the receive buffer 53A has been extended in storage capacity, it is possible to store the print data from the personal computer 10 in the extended area, thereby making it possible to rapidly release the transmission standby state in the personal computer 10.

Then, in S9 and S10, while putting the remaining portion of print data, which has not been received among the print data to be cancelled, into the extended area of the receive buffer 53A, the CPU 54 reads the print data in the receive buffer 53A. Then, in S11, the CPU 54 determines whether or not there is an end command in the read portion of print data. If there is not the end command (N in S11), in S12, the CPU 54 discards the read portion of print data in the same way as in S4, and returns again to S9. If there is the end command (Y in S11), it means that the CPU 54 has received and discarded all the print data to be cancelled.

Subsequently, the CPU 54 determines whether or not new print data to be received next (print data not to be cancelled) is included in the print data received after the data reception has been restarted. In a case in which new print data, following the print data to be cancelled, is transmitted from the personal computer 10, the new print data may already be stored in the receive buffer 53A. If so (Y in S13), when the storage capacity of the receive buffer 53A is restored to the prescribed default ratio, the new print data may undergo a data corruption. Therefore, the CPU 54 brings the cancellation process to an end without carrying out such a restoration. The configuration may be such that the storage capacity of the receive buffer 53A is restored when the state of not receiving the print data has continued for a prescribed time thereafter.

On the contrary, in the event that the new print data is not stored in the receive buffer 53A (N in S13), the storage capacity of the receive buffer 53A is restored to the prescribed default ratio (S14).

(2) Data-Type-Dependent Process

In this aspect, the CPU 54 also executes a data-type-dependent process, which extends the storage capacity of the receive buffer 53A in accordance with whether or not the print data being received is a data type which requires time for the printing process, in short, whether it is the PDL data or the bitmap data. The data-type-dependent process by the CPU 54 will hereafter be described with reference to the flowchart shown in FIG. 4.

The CPU 54, in S21, reads, in order, the portion of print data, which has already been stored in the receive buffer 53A among the print data being currently received, for each of the prescribed unit amount of data and, in S22, determines from the header information of the print data whether or not the print data is the PDL data. At this time, the CPU 54 functions a "data type detection unit". If it is the PDL data (Y in S22), in S23, the CPU 54 stops the data reception from the personal computer 10 and, in S22, executes the expansion process in which the already received portion of print data is expanded to the work memory 53B to create page data.

Next, in S25, in the same way as in S6 of FIG. 3, the CPU 54 determines whether or not there is a space area for extending the receive buffer 53A in the RAM 53. If there is the space area (Y in S25), in S26, in the same way as in S7 of FIG. 3, the CPU 54 allocates the partial storage capacity of the work memory 53B and the page memory 53C to the receive buffer 53A, thus extending the storage capacity of the receive buffer 53A, and in S27 restarts receiving the print data from the personal computer 10. At this time, as the receive buffer 53A has been extended in storage capacity, it is possible to store the print data from the personal computer 10 in the extended area. Thus, even in a case of receiving print data, which requires time for the printing process, such as the PDL data, it is possible to rapidly release the transmission standby state in the personal computer 10.

On the contrary, if the print data is the bitmap data (N in S22), it eliminates the need for the expansion process and does not take time overall for the printing process. Therefore, the printing process for the print data in the receive buffer 53A proceeds at a relatively high speed, and the space area of the receive buffer 53A is secured without the storage capacity thereof being extended. Consequently, in this case, the CPU 54 moves to S28 without stopping the data reception.

In S28 and S29, while putting the print data into the receive buffer 53A, the CPU 54 reads the print data in the receive buffer 53A. Then, in S30, the CPU 54 determines whether or not there is an end command in the read portion of print data. If there is no end command (N in S30), in S31, the CPU 54 executes an expansion process in which the read portion of print data, if it is the PDL data, is expanded to the work memory 53B to create page data, and executes the process of sending the page data to the printing section 51. If the read portion of print data is the bitmap data, the CPU 54 executes the process of sending it to the printing section 51 as it is. As S32 and S33 are the same process as S13 and S14 in FIG. 3, the description will be omitted.

Incidentally, the data-type-dependent process is always executed when the print data from the personal computer 10 is received, and when a cancellation instruction is issued during the execution, the cancellation process is interrupt executed.

3. Advantage of this Aspect (1) When the cancellation process is executed, the receive buffer 53A is extended in storage capacity (S7). Therefore, it is possible to store the print data from the personal computer 10 in the extended area, thereby making it possible to rapidly release the transmission standby state in the personal computer 10. Also, the receive buffer 53A is not always maintained large, but the configuration is such that the receive buffer 53A is extended when a cancellation instruction is issued. Therefore, it is not necessary to secure a wide receive buffer 53A in advance.

(2) By executing the data-type-dependent process, the receive buffer 53A is extended in storage capacity (S26). Therefore, it is possible to store the print data from the personal computer 10 in the extended area, and even in the case of receiving print data which requires time for the printing process, such as the PDL data, it is possible to rapidly release the transmission standby state in the personal computer 10.

(3) The restoration of the storage capacity of the receive buffer 53A is automatically carried out after the reception of the print data being received is finished, that is, after the end command is detected. Therefore, such a configuration is more convenient than the configuration in which the restoration is carried out by a user's input operation. Moreover, the storage capacity of the receive buffer 53A is restored to the prescribed default ratio, thereby constituting a simpler and more suitable configuration. Furthermore, as the configuration is such that the restoration is carried out on condition that there is not new print data to be received next in the receive buffer 53A, it is possible to prevent a data corruption of the new print data.

(4) Also, for example, in the event that there is no space area or a small space area in the RAM 53 (N in S6 and S25), the receive buffer 53A is prevented from increasing, thus preventing interference with the processing of the work memory 53B and the page memory 53C.

(5) When a ratio change is carried out with the print data stored in the receive buffer 53A, the process is likely to become complicated. Therefore, in this aspect, the configuration is such that the ratio change is carried out after the reception of the print data is temporarily stopped (S1 and S23) and the print data stored in the receive buffer 53A is finished being processed and is emptied.

<Other Aspects>

The invention is not limited to the aspect described above with reference to the drawings. For example, the following aspects are also included in the technical scope of the invention and, furthermore, various modifications other than the following can be made and practiced without departing from the spirit of the invention.

(1) In the aforementioned aspect, the configuration is such that the receive buffer 53A extended is restored to the original, pre-extension default storage capacity, but the invention is not limited to this configuration. The configuration may be such that the ratio in the RAM 53 is reduced in such a way as to have smaller capacity than at the time of extension. However, with the configuration of the aforementioned aspect, the configuration will become simpler and more suitable.

(2) In the aforementioned aspect, the configuration is such that the receive buffer 53A is extended in such a way as to have a predetermined ratio, but the invention is not limited to this configuration. The configuration may be such that the receive buffer 53A is extended by an amount equivalent to the space area in the RAM 53 at the time, and such that the storage capacity of the receive buffer 53A is thus secured to be as wide as possible.

(3) Also, for example, in the case of receiving print data having data amount information added to its header, the data amount of the print data being currently received can be known from the data amount information. By using this, the configuration may be such that the storage capacity of the receive buffer 53A is increased by the ratio corresponding to the data amount information, and such that unnecessary extension of the receive buffer 53A is avoided.

(4) In the aforementioned aspect, the personal computer 10 and the printer 20 are connected to the Internet 18 via the network interfaces 17 and 55 and are configured in such a way as to be capable of performing data communication between them. However, the invention is not limited to a public communication channel such as the Internet, but the configuration may be such that the personal computer 10 and the printer 20 are communicably connected via an intranet using an internal LAN or the like. Also, the configuration may be such that the personal computer 10 and the printer 20 are locally connected via a parallel port, a USB port or the like.

(5) In the aforementioned aspect, the configuration is such that the data reception from the personal computer 10 is stopped and a ratio change of the receive buffer 53A is carried out after the receive buffer 53A is emptied of data. The reason is that, as described above, in the aforementioned aspect, the receive buffer 53A is made up of a ring buffer and is configured in such a way that the data write pointer is moved to the storage start position of the data to be discarded, thus making it possible to write other data thereover. Therefore, when the ratio change of the receive buffer 53A is carried out with data remaining in the receive buffer 53A, the problems of corruption of the remaining data and the like can occur unless a complicated mechanism to coordinate the transitional range of the write pointer with that of a read pointer is introduced. However, for example, in the event that the following configuration is adopted, the ratio change of the receive buffer area can be carried out without stopping the data reception. Specifically, when the cancellation instruction is issued or it has been detected in the data-type-dependent process that the data type is the PDL data, the ratio change unit (CPU 54) generates a second receive area that is manageable separately from a first receive buffer area that has stored the print data received, and increases the overall ratio of the receive buffer area in the storage unit. Then, the CPU 54, which functions as receive buffer storage control unit, uses the first receive buffer area and the second receive buffer area to store the print data to be received thereafter. With such a configuration, it is possible to carry out the ratio change of the receive buffer area without stopping the data reception, thus making it possible to more rapidly release the transmission standby state at a transmission source.

As was described, according to the aspect of the invention, the ratio change unit, in the case in which it has increased the ratio, reduces the ratio increased after the reception of the print data being received has been completed.

Also, the ratio change unit returns the ratio increased to the original, pre-change ratio.

The configuration may be such that the ratio changed is reduced by a user's panel operation or the like, but it involves time. Therefore, as in the above aspect, a configuration that automatically reduces the ratio changed is preferable. Also, in the event that the configuration is such that the ratio changed is returned to the original, pre-change ratio as in the configuration of claim 4, a simpler and more suitable configuration will be provided.

Also, the ratio change unit reduces the ratio increased after the reception of the print data being received has been completed and in the event that there is no reception of new print data to be received next.

For example, in the event that the ratio is reduced in the state in which new print data to be received next has already started to be stored in the receive buffer area, a data corruption is likely to occur. For this reason, in the above aspect, the configuration is such that the ratio increased is reduced in the event that there is no new print data to be received next.

Further, the image forming apparatus is equipped with a space area check unit that checks a space area in the storage unit, wherein the ratio change unit determines whether or not to extend the ratio, based on a check result by the space area check unit.

According to the above aspect, for example, in the event that there is no space area or a small space area in the storage unit, the receive buffer area is prevented from increasing, thus preventing interference with the processing of other memory areas.

Further, the space area check unit may check a space area in the storage unit, so that the ratio change unit increases the ratio by a ratio corresponding to the space area checked by the space area check unit.

According to this configuration, the configuration is such that the receive buffer area is expanded in the storage unit by a ratio corresponding to the space area in the storage unit, thus expanding the receive buffer area in consideration of the space area in the storage unit.

Further, the image forming apparatus is equipped with a data amount information acquisition unit that acquires data amount information for the print data being received by the receiving unit, wherein the ratio change unit increases the ratio by a ratio corresponding to the data amount information acquired by the data amount information acquisition unit.

For example, in the case of receiving print data having data amount information added to its header, the data amount of the print data being currently received can be known from the data amount information. In this configuration, the configuration is such that the receive buffer area is increased by the ratio corresponding to the data amount information, and such that unnecessary expansion of the receive buffer area is avoided.

Furthermore, the ratio change unit, when changing the ratio of the receive buffer area, carries out the ratio change after temporarily stopping the reception of the print data being received and emptying the print data stored in the receive buffer area.

When a ratio change is carried out with the print data stored in the receive buffer area, the process is likely to become complicated. Therefore, in this configuration, the configuration is such that the ratio change is carried out after the processing of the print data stored in the receive buffer area is finished and the receive buffer area is emptied of the data.

What is claimed is:

1. An image forming apparatus comprising:
    a receiving unit that receives print data via a communication line;
    a storage unit that comprises a plurality of storage areas, which comprise at least a receive buffer area that temporarily stores the print data received by the receiving unit and a second memory area;
    an image forming unit that carries out an image forming process based on the print data;
    a cancellation instruction unit that issues an instruction to cancel the image forming process by the image forming unit with respect to the print data being received by the receiving unit; and
    a ratio change unit that increases a ratio of a storage capacity of the receive buffer area with respect to a storage capacity of the storage unit in response to the cancellation instructed by the cancellation instruction unit and decreases a ratio of a storage capacity of the second memory area to the storage capacity of the storage unit.

2. The image forming apparatus according to claim 1, wherein the ratio change unit, in the case in which it has increased the ratio, reduces the increased ratio after the reception of the print data being received has been completed.

3. The image forming apparatus according to claim 2, wherein the ratio change unit returns the increased ratio to an original ratio.

4. The image forming apparatus according to claim 2, wherein the ratio change unit reduces the increased ratio after the reception of the print data being received has been completed and in the event that there is no reception of new print data to be received next.

5. The image forming apparatus according to claim 1, further comprising a space area check unit that checks a space area in the storage unit, wherein the ratio change unit determines whether or not to extend the ratio, based on a check result by the space area check unit.

6. The image forming apparatus according to claim 1, further comprising a space area check unit that checks a space area in the storage unit, wherein the ratio change unit increases the ratio by a ratio corresponding to the space area checked by the space area check unit.

7. The image forming apparatus according to claim 1, further comprising a data amount information acquisition unit that acquires data amount information for the print data being received by the receiving unit, wherein the ratio change unit increases the ratio by a ratio corresponding to the data amount information acquired by the data amount information acquisition unit.

8. The image forming apparatus according to claim 1, wherein, when changing the ratio of the receive buffer area, the ratio change unit carries out the ratio change after temporarily stopping the reception of the print data being received and emptying the print data stored in the receive buffer area.

9. The image forming apparatus according to claim 1, the second memory area of the storage unit further comprising:
 a work memory area configured to expand the print data to create page data or
 a page memory area for storing page data;
wherein the ratio change unit decreases the ratio of the work memory area or the page memory area in the storage unit when increasing the ratio of the receive buffer area.

10. An image forming apparatus comprising:
 a receiving unit that receives print data via a communication line;
 a storage unit that includes a plurality of storage areas, which includes at least a receive buffer area that temporarily stores the print data received by the receiving unit;
 an image forming unit that carries out an image forming process based on the print data;
 a data format detection unit which detects a data format of the print data being received by the receiving unit; and
 a ratio change unit that increases a ratio of a storage capacity of the receive buffer area with respect to a storage capacity of the storage unit in the event that the data format detected by the data format detection unit has a predetermined format and stores the print data in the receive buffer area.

11. The image forming apparatus according to claim 10, wherein the ratio change unit, in the case in which it has increased the ratio, reduces the increased ratio after the reception of the print data being received has been completed.

12. The image forming apparatus according to claim 11, wherein the ratio change unit returns the increased ratio to an original ratio.

13. The image forming apparatus according to claim 11, wherein the ratio change unit reduces the increased ratio after the reception of the print data being received has been completed and in the event that there is no reception of new print data to be received next.

14. The image forming apparatus according to claim 10, further comprising a space area check unit that checks a space area in the storage unit, wherein the ratio change unit determines whether or not to extend the ratio, based on a check result by the space area check unit.

15. The image forming apparatus according to claim 10, further comprising a space area check unit that checks a space area in the storage unit, wherein the ratio change unit increases the ratio by a ratio corresponding to the space area checked by the space area check unit.

16. The image forming apparatus according to claim 10, further 1, comprising a data amount information acquisition unit that acquires data amount information for the print data being received by the receiving unit, wherein the ratio change unit increases the ratio by a ratio corresponding to the data amount information acquired by the data amount information acquisition unit.

17. The image forming apparatus according to claim 10, wherein, when changing the ratio of the receive buffer area, the ratio change unit carries out the ratio change after temporarily stopping the reception of the print data being received and emptying the print data stored in the receive buffer area.

18. The image forming apparatus according to claim 10, wherein the predetermined format is a data format which requires the image forming unit to perform an expansion process on the print data.

19. The image forming apparatus according to claim 18, wherein the predetermined format is a PDL format.

20. An image forming apparatus comprising:
 a receiving unit that receives print data via a communication line;
 a storage unit;
 a controller that provides a plurality of storage areas in the storage unit, the storage areas comprise at least a receive buffer area for temporarily storing the print data received by the receiving unit and a second memory area;
 an image forming unit that carries out an image forming process based on the print data;
 a cancellation instruction unit that issues an instruction to cancel the image forming process by the image forming unit with respect to the print data; and
 a cancellation unit that, in response to the instruction, clears data which is related to the print data and temporarily stored in the receive buffer area,
wherein the controller increases a storage capacity of the receive buffer area in response to the cancellation instructed by the cancellation instruction unit and decreases a ratio of a storage capacity of the second memory area to the storage capacity of the storage unit.

* * * * *